United States Patent
Schlotterbeck et al.

(10) Patent No.: US 11,052,347 B2
(45) Date of Patent: Jul. 6, 2021

(54) BULK PROCESS GAS PURIFICATION SYSTEMS

(71) Applicant: ENTEGRIS, INC., Billerica, MA (US)

(72) Inventors: Matthew Schlotterbeck, Atascadero, CA (US); Daimhin Paul Murphy, San Diego, CA (US)

(73) Assignee: ENTEGRIS, INC., Billerica, MA (US)

( * ) Notice: Subject to any disclaimer, the term of this patent is extended or adjusted under 35 U.S.C. 154(b) by 321 days.

(21) Appl. No.: 16/230,524

(22) Filed: Dec. 21, 2018

(65) Prior Publication Data

US 2020/0197861 A1    Jun. 25, 2020

(51) Int. Cl.
*B01D 53/26* (2006.01)
*B01D 53/02* (2006.01)
*B01D 53/86* (2006.01)

(52) U.S. Cl.
CPC ............ *B01D 53/261* (2013.01); *B01D 53/02* (2013.01); *B01D 53/8668* (2013.01); *B01D 2253/102* (2013.01); *B01D 2257/504* (2013.01); *B01D 2257/80* (2013.01)

(58) Field of Classification Search
CPC ...... B01D 53/26; B01D 53/261; B01D 53/02; B01D 53/8668; B01D 2253/102; B01D 2257/504; B01D 2257/80

USPC ........................................................... 502/20
See application file for complete search history.

(56) References Cited

U.S. PATENT DOCUMENTS

| | | |
|---|---|---|
| 4,249,915 A | 2/1981 | Kratz |
| 5,202,096 A | 4/1993 | Jain |
| 5,906,675 A | 5/1999 | Jain |
| 6,077,488 A | 6/2000 | Jain |
| 6,471,749 B1 | 10/2002 | Kawai |
| 7,449,054 B2 | 11/2008 | Rabellino |
| 7,824,628 B2 | 11/2010 | Alvarez, Jr. |
| 8,268,045 B2 | 9/2012 | Lim |
| 8,931,262 B2 | 1/2015 | Quaade |
| 2003/0037672 A1 | 2/2003 | Sircar |
| 2007/0193446 A1 | 8/2007 | Nakamura |
| 2009/0232986 A1 | 9/2009 | Choi |
| 2010/0062296 A1 | 3/2010 | Johannessen |
| 2015/0075636 A1 | 3/2015 | Sugawara |

FOREIGN PATENT DOCUMENTS

| | | |
|---|---|---|
| EP | 1027913 A4 | 11/2001 |
| JP | 2013227648 A | 11/2013 |
| TW | 448069 B | 8/2001 |
| WO | 2017035023 A1 | 3/2017 |

*Primary Examiner* — Edward M Johnson
(74) *Attorney, Agent, or Firm* — Entegris, Inc.

(57) ABSTRACT

Described are bulk process gas purification systems and related methods, including systems that are adapted to use a volume of gas at an exterior surface of a vessel, e.g., a flow of the gas, to control a temperature of the vessel interior during a recharging step, during a cooling step that follows a recharging step, or both.

16 Claims, 3 Drawing Sheets

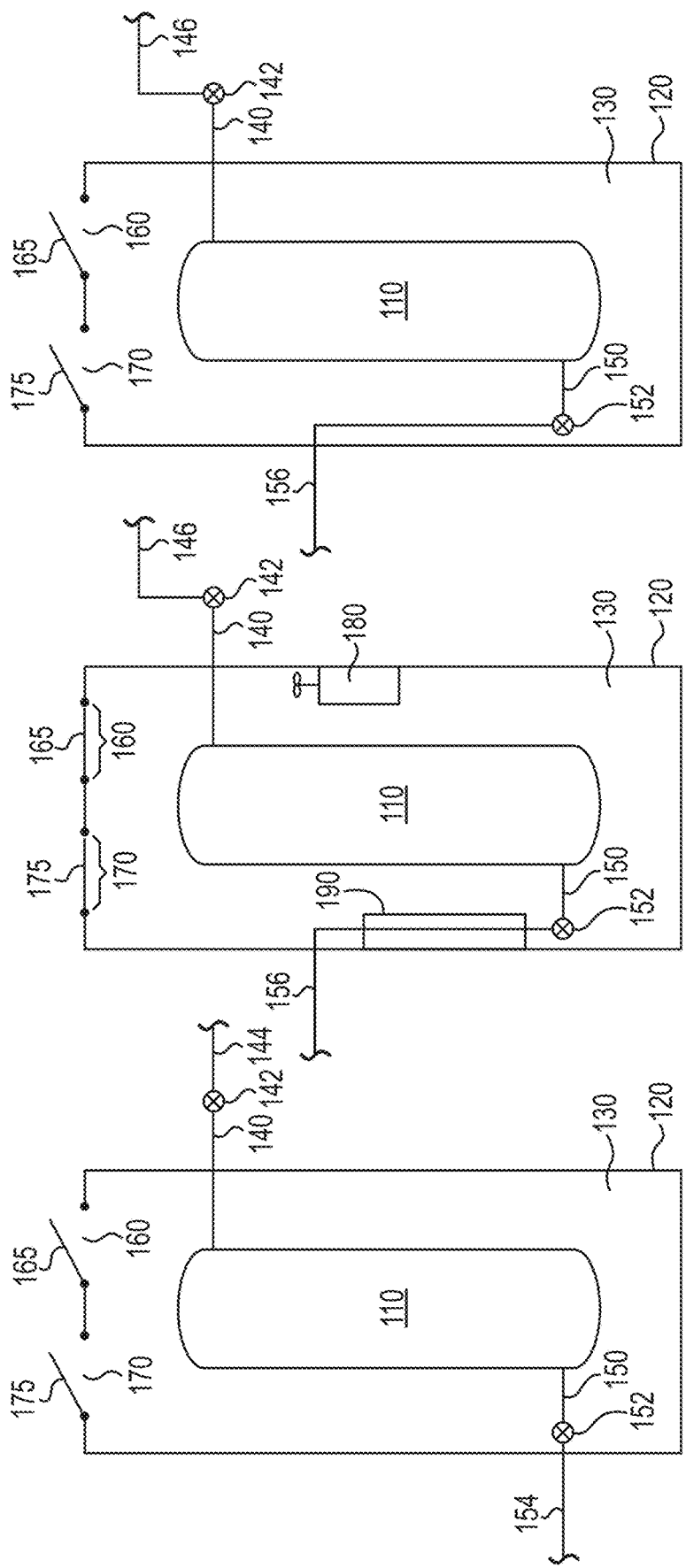

BULK PROCESS GAS PURIFICATION SYSTEMS

FIELD OF THE DISCLOSURE

This disclosure relates to bulk process gas purification systems and related methods, including systems that are adapted to use a volume of gas at an exterior surface of a vessel, e.g., a flow of the gas, to control a temperature of the vessel interior during a recharging step, during a cooling step that follows a recharging step, or both.

BACKGROUND

In the electronics industry, high purity specialty gases such as hydrogen, argon, helium, oxygen, carbon dioxide, nitrogen, ammonia ($NH_3$), and extra clean dry air are required for many operations and are generally obtained in either high purity cylinder form or from bulk gas sources which are purified at a point of use, such as at a semiconductor fabrication plant. High purity cylinder sources are capable of providing required high levels of purity for the gaseous raw materials, but may not be convenient or cost effective where very large volumes of gas are needed on a continuous basis at multiple points of use within a manufacturing facility.

As an alternative to cylinder sources, bulk source specialty gases may be used for certain types of gaseous raw materials. Bulk source specialty gases may be stored in pressurized or liquefied form in tank cars, tank trucks, large scale on-site storage, or the like, or may be sourced from compressors located at or near a point of use. Bulk source specialty gases can be provided in large volumes, but may need to be processed to a substantial degree for the gas to meet required high standards of purity.

When bulk source specialty gases are used, an on-site purification system capable of purifying very large volumes of a specialty gas on a continuous basis may be used to achieve the necessary levels of high purity and high volume. Such a purification system may operate centrally within a manufacturing plant to deliver a gaseous raw material to multiple destinations within the plant, which may include multiple work spaces and multiple manufacturing apparatus (tools). The use of a central purification system may result in efficiency and cost savings relative to other modes of providing a gaseous raw material.

Typical on-site purification systems include at least one, but more typically at least two, purification vessels that contain a purification media (e.g., filter media) for purifying a specific type of bulk process gas. In a purification process of a typical on-site purification system, a flow of bulk process gas enters a purification vessel through a vessel inlet, passes through the purification media that is contained at the interior of the vessel, and exits the vessel through a vessel outlet in the form of purified bulk process gas that then distributed to one or multiple different destinations within a manufacturing facility. The purification media may include filter media such as an adsorbent that sequesters impurities such as water (humidity), hydrocarbons, microscopic particulates, or other contaminants. The purification process is operated at a purification temperature. In some systems, a typical range of purification temperatures is from 10 degrees Celsius to 60 degrees Celsius. Excessively high purification temperatures should be avoided, as too high of a temperature may reduce the ability of purification media to sequester contaminants or even cause purification media to release previously sequestered contaminants.

To maintain effectiveness, the purification media within the purification vessel must be periodically regenerated. In a regeneration process, valves at the vessel inlet and outlet are closed to take the vessel off-line (i.e., closed to apparatus to which the vessel supplies a gaseous raw material) and to allow a regeneration gas heated to a regeneration gas temperature to be passed through the filter media within the purification vessel. Typically, to prevent contamination of the filter media in the vessel, the regeneration gas is a purified gas such as previously-purified bulk process gas, e.g., bulk process gas that has been already purified (e.g., using the same vessel or a counterpart vessel) and optionally stored. Alternately, the regeneration gas can be a gas other than previously-purified bulk process gas; if so, the regeneration gas must be of a high purity such that it contributes to removal of contaminants. Typical regeneration gas temperatures are in excess of 60 degrees Celsius when passing through the vessel, often well in excess of 60 degrees Celsius, and may be in the range from 250 to 450 degrees Celsius.

SUMMARY

A purification vessel, after a regeneration step, can be brought back on line and used for continued manufacturing only after the vessel and its contained filter media have cooled to a useful operating temperature. In some systems, the regeneration process includes a regeneration step followed by a cooling step during which a cooling gas at a cooling gas temperature (below the regeneration temperature) is passed through the filter medium within the purification vessel to remove heat from the filter medium and reduce the temperature of the filter medium. The cooling gas can be a pure gas, such as purified bulk process gas, which may be purified bulk process gas that was previously purified and stored or purified bulk process gas sourced from another vessel. Typical cooling gas temperatures may be from 10 degrees Celsius and 60 degrees Celsius.

Typical on-site purification systems comprise at least two purification vessels and accompanying conduits and valves to allow one vessel to continue in operation while the other is regenerated.

In one aspect, the invention relates to a bulk process gas purifier system. The system includes a purifier that includes a vessel having a vessel interior that contains purification media. The system also includes an enclosure that encloses the vessel and defines an interspace that is inside the enclosure and external to the vessel. The enclosure includes air circulating passages to allow: a flow of ambient gas into the interspace at a positive input pressure; non-convective circulation of the ambient gas within the interspace; and flow of circulated ambient gas from the interspace to an exterior of the enclosure at a positive outlet pressure. The air circulating passages include: an enclosure inlet that allows a flow of ambient gas at a positive input pressure from the exterior of the enclosure into the interspace; an enclosure outlet that allows a flow of ambient gas at a positive output pressure from the interspace to an exterior of the enclosure; and a bulk process gas circulating system adapted to cause the bulk process gas to flow into the vessel interior, through the purification media, and out of the vessel interior.

In another aspect the invention relates to a method of using and regenerating purification media of a bulk process gas purifier system as described herein. The method includes: passing bulk process gas through the purification media at purification temperature to cause impurities in the bulk process gas to be removed by the purification media, and to produce purified bulk process gas having a reduced level of the impurities; after impurities have collected in the purification media, regenerating the purification media by passing regeneration gas having a regeneration gas temperature through the purification media, whereby the regeneration gas heats the purification media to a regeneration temperature to cause collected impurities to be removed from the purification media and flow from the vessel with the regeneration gas; after regenerating the purification media, cooling the purification media by passing cooling gas, at a cooling gas temperature that is below the regeneration temperature, through the purification media to reduce the temperature of the purification media. During cooling, a flow of ambient air is passed through the interspace at an ambient air cooling temperature that is below 60 degrees Celsius, with the ambient air: passing from a location exterior to the system enclosure, through the enclosure inlet, and into the interspace; circulating within the interspace in a non-convective manner; and passing from the interspace through the enclosure outlet to a location exterior to the enclosure.

The preceding summary of the present disclosure is not intended to describe each embodiment of the present invention. The details of one or more embodiments of the invention are also set forth in the description below. Other features, objects, and advantages of the invention will be apparent from the description and from the claims.

All scientific and technical terms used herein have meanings commonly used in the art unless otherwise specified.

As used in this specification and the appended claims, the singular forms "a," "an," and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

BRIEF DESCRIPTION OF THE DRAWING

FIGS. 3A, 3B, and 3C, are schematic depictions of a portion of one embodiment of a gas purification system during the purification process, the regeneration step of the regeneration process, and the cooling step of the regeneration process, respectively.

DETAILED DESCRIPTION

Figure 1:
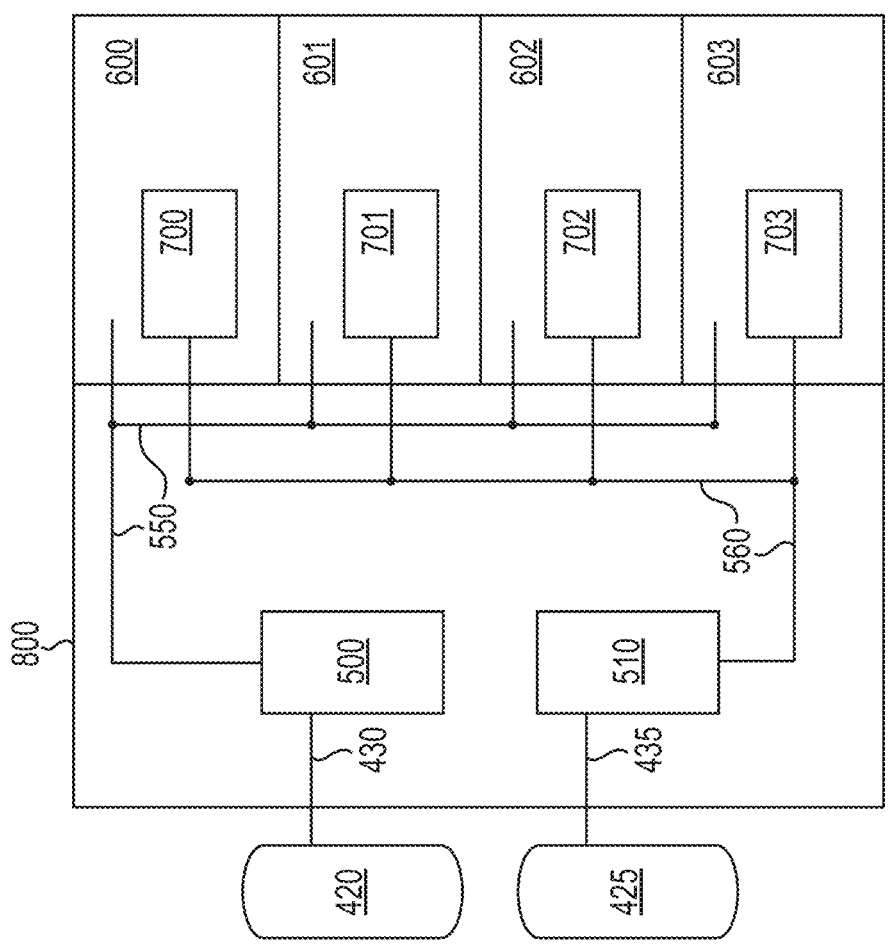
FIG. 1 is a schematic depiction of one embodiment of the use of gas purification systems according to the present disclosure in a semiconductor manufacturing plant.

The following description relates to methods and apparatus that enable a faster cooling step in a regeneration process of a purification vessel that includes a regeneration step during which the purification vessel and its contents of filter media are heated, followed by a cooling step during which the purification vessel and its contents are cooled.

A faster regeneration process results in a number of advantages. A regeneration process consumes an amount of regeneration gas during the regeneration step and an amount of cooling gas in the cooling step. Each of these gases is typically a purified bulk process gas that has been previously purified by the purification system being regenerated (or a counterpart), and would otherwise be used for manufacturing operations. Reducing the amount of time for performing a cooling step of a regeneration process conserves cooling gas by reducing the total amount of cooling gas that is consumed during the cooling step. Also, because the purification vessel must be off-line during the regeneration process, including the cooling step, the peak capacity of a dual vessel purification system is halved. A faster regeneration process (including a cooling step) reduces this disadvantage. During regeneration, the security offered by the redundancy of a dual vessel system is lost. A faster regeneration process reduces this disadvantage.

Methods and systems of the present disclosure involve a cooling step that follows a regeneration step, with the cooling step using cooling gas passed through a purification vessel to reduce a temperature of filter media contained at the interior of the vessel. In addition to the flow of cooling gas at the vessel interior, the methods and systems also involve added control of the vessel temperature during the cooling step by using a non-convective flow of gas at an exterior of the vessel.

According to the invention, the vessel is contained in an enclosure that is a substantially closed structure that includes sidewalls, a floor or bottom, and a top. The enclosure defines a limited amount of space around the vessel, between the outside of the vessel and the inside of the enclosure, that space being referred to herein as an "interspace." While the enclosure is substantially closed, it also includes at least two air circulating passages (e.g., an inlet and an outlet) in the walls, floor, or bottom of the enclosure that allow for a useful flow of or another ambient gas to be passed into, through, and out of the interspace. The air circulating passages are of a size and placement that allow for a useful volume of air (or another ambient gas) to be caused to flow into the enclosure, through the interspace, and out of the enclosure, with the volumetric flow of the air being sufficient to removing a desired amount of heat from the vessel to reduce the temperature of the vessel and its contents at a desired rate of temperature reduction.

The air flow through the interspace can be "forced" or "non-convective." For example, a mechanical impetus, e.g., from a fan or other air-circulating device, may be used to impart movement of air to cause the air to flow through the interspace. The forced (non-convective) flow of air is different from certain other forms of airflow that may be considered convective, passive, or merely incidental (due to the movement of air external to the enclosure), but that may also or otherwise occur in an interspace that contains a heated vessel as described.

In a system or method as described, air flow caused by "convection," i.e., "convective" air flow, within an interspace, is considered to be movement (flow) of air within the interspace that results substantially or entirely from a temperature and resulting density difference between air that is located at or near a surface of a heated vessel within the interspace, compared to nearby air that is within the interspace but away from the surface, with the temperature difference being caused by the transfer of heat energy from the heated vessel to the air that is located at or near the surface; in this situation, gravity will cause air masses of different temperatures and densities to move within the interspace. This type of convective air circulation within an interspace can occur incidentally within a purifier system that is not designed as described herein to use a forced or "non-convective" flow of air through the interspace for the specific purpose of absorbing and removing heat energy from a heated vessel after a regeneration step and during a step of cooling the interior of the vessel by passing cooling gas through the vessel interior.

As used herein, "non-convective" air flow within an interspace includes the type of air flow produced by energy being mechanically imparted onto a volume of air ("mechanically-assisted air movement" or "forced" air movement), as opposed to the type of air flow that results from air in an interspace absorbing heat energy from a heated vessel; non-convective air flow can be produced by energy that is imparted mechanically to air by the use of a fan or other mechanical impeller, so that the air is directed (drawn or blown) through an inlet of the enclosure, into and through the interspace, and then out of the enclosure through an outlet.

The inlet and the outlet are designed and adapted (e.g., in their sizes and locations as part of the enclosure) to specifically accommodate a flow of ambient gas (e.g., air) that has a volume (volumetric flow rate) and temperature (e.g., an ambient temperature) to cause accelerated or rapid cooling of a heated vessel contained in the enclosure, when the ambient gas is caused to flowed through the interspace. The source of mechanical energy (e.g., fan) that causes the non-convective flow can be located within the enclosure or outside of the enclosure, such as in ducting that is a distance away from but in fluid communication with the interior of the enclosure.

In an apparatus according to the present disclosure, the purification vessel is substantially contained in a purification vessel enclosure which creates an interspace internal to the enclosure and external to the vessel. The purification vessel enclosure encloses a single purification vessel, and is thus distinguished from a purification system housing that may enclose two or more vessels (each also contained in a separate enclosure) and may enclose all or most of an entire purification system. However, in some embodiments the purification vessel enclosure may share one or more boundaries with a purification system housing, such as a floor or lower boundary, a ceiling or upper boundary, or one or more walls. The purification vessel enclosure is likewise distinguished from larger enclosures such as a room, building (e.g., factory), or portion of a building, in which the purification system is installed. In some embodiments, the vessel is cylindrical and the enclosure is rectangular or box-shaped. A clearance distance is greater at corners of the enclosure and is smaller at locations along the wall between the corners. At locations along the wall and between the corners, a minimum distance between the vessel and an enclosure wall may be 2 inches, one inch, or a half of an inch. For an example vessel that has a diameter of 36 inches, a distance between the vessel and a corner of the enclosure may be in a range from approximately 26 to approximately 28 inches; the distance will be comparably greater or smaller distances for a cylindrical vessel of a greater or smaller diameter.

The purification vessel enclosure includes at least one enclosure inlet to allow for a non-convective flow of ambient atmosphere into the interspace. The inlet can be connected to ducting and a source of ambient air that can be caused (e.g., by a fan) to flow through the inlet and into the interspace. The ambient air can be taken from any source of relatively clean air, and need not be purified, and may or may not be processed by filtering. The air (e.g., "ambient gas") may be supplied, for example, from a location of a factory that contains the purifier system but is away from (either near to or distant from, generally) the purifier system, or may alternately be supplied from a location that is external to the factory. The temperature of the ambient air when introduced to the interspace can be a temperature that is below the temperature of the vessel contained in the interspace, e.g., an ambient air temperature in a range from 30 to 120 degrees Fahrenheit, such as from 40 or 50 to 75 or 80 degrees Fahrenheit.

A useful or preferred inlet can be of a size to accommodate airflow of ambient air at a flow rate of at least 50 to 400 cubic feet per minute, such as from 100 to 300 cubic feet per minute. An example size of the inlet, i.e., the area of the inlet opening, can be in a range from about 7 square inches to about 100 square inches, e.g., from 15 to about 75 square inches, and can be opened and closed using a baffle or other closure device.

The enclosure inlet may be a single opening, and may optionally and preferably be adapted to allow for fluid communication with an ambient atmosphere through ducting or another form of fluid conduit. The enclosure inlet is equipped with an inlet damper to selectively open and close the enclosure inlet, to selectively allow or prevent a flow of air or another ambient gas through the inlet and into the interspace. The inlet damper may be capable of operation by hand or by servo, motor, pneumatic actuator, or the like. The inlet damper may be capable of remote or automated operation, including operation directed by a computer processing unit. The inlet is distinguished from smaller openings (e.g., "pass-throughs" as specified hereinabove) that would allow for only small and incidental amounts of passive, convective airflow.

The purification vessel enclosure includes at least one enclosure outlet to allow flow of gas or air out of the interspace into the ambient atmosphere. A useful or preferred outlet can be of a size to accommodate airflow of ambient air at a flow rate of at least 50 to 400 cubic feet per minute, such as from 100 to 300 cubic feet per minute. The size of the outlet, i.e., the area of the outlet opening, can be in a range from about 7 square inches to about 100 square inches, e.g., from 15 to about 75 square inches, and can be opened and closed using a baffle or other closure device.

The ambient gas is caused to flow into the interspace through the inlet at a positive pressure, meaning a pressure that is greater than an ambient pressure at a location external to the enclosure. For example, the ambient gas may enter the enclosure as a gas that has a pressure (measured at the inlet) that is at least 50 torr higher than an ambient pressure, e.g., in a range from 50, 100, or 200 torr, up to 400, 500, 600, or 700 torr. The pressure of the ambient gas as the gas flows through the interspace, i.e., the pressure at the interspace, can also be greater than the ambient pressure, e.g., at least 20 or 40 torr greater than the ambient pressure.

The enclosure outlet may be a single opening and may optionally and preferably communicate with an ambient atmosphere through duct work. The enclosure outlet is equipped with an outlet damper to selectively open and close the enclosure outlet, to selectively allow or prevent a flow of air out of the interspace. The outlet damper may be capable of operation by hand or by servo, motor, pneumatic actuator, or the like. The outlet damper may be capable of remote or automated operation, including operation directed by a computer processing unit.

Different from air circulating passages, the purification vessel enclosure, e.g., at sidewalls, a top, or a bottom, may also optionally be equipped with small openings (e.g., "pass-throughs") designed to allow for the passage of various conduits, electrical wiring or cables, fluid-lines, and the like, from an exterior of the enclosure to the interior, for operating the gas purification system. The enclosure structure may also include small vents, cracks, or other small openings that are not considered to be air circulating passages as described herein, at least because those types of openings are not designed or used for the purpose of causing a forced (non-convective) flow of air through an interspace to reduce the temperature of heated vessel contained in the enclosure.

The purification vessel enclosure may incidentally serve as a mounting structure for various conduits, cables, valves, and the like which form a part of the operation of the gas purification system. Desirably, the outside surface of the purification vessel is in direct contact with air or gas in the interspace so as to allow efficient heat transfer between the outer surface and air or gas that is caused to flow through the interspace. In such embodiments, the purification vessel is not partially or wholly covered with any external article such as a heat blanket, insulation blanket, or the like.

In certain useful or preferred example systems, the purification vessel enclosure may be equipped with one or more fans, impellers, or other air moving apparatus, collectively referred to herein as "fans." For example, the purification vessel enclosure may be equipped with one or more inlet fans configured to draw ambient gas or air into the interspace through the enclosure inlet. Alternately or in addition, the purification vessel enclosure may be equipped with one or more outlet fans configured to expel gas or air from the interspace through the enclosure outlet.

Alternately, or in addition, the enclosure may be equipped with one or more circulation fans at the interior of the enclosure, i.e., within the interspace, configured to circulate gas or air within the interspace. In various embodiments, the purification vessel enclosure may be equipped with any combination of inlet fans, outlet fans, or interspace-circulation fans. Such fans may be located within the purification vessel enclosure, or, in various embodiments, fans or portions thereof maybe located outside the purification vessel enclosure.

In a useful or preferred system, the enclosure may include one or more heaters, heat exchangers, radiators, or other heat transmitting apparatus, collectively referred to herein as "heaters." The heater is typically configured so that it may selectively increase the temperature of gas or air in the interspace within the purification vessel enclosure. The heater may be located at the interior of enclosure, i.e., within the interspace. In some embodiments, a heater principally tasked with heating the regeneration gas can be located in or attached to the enclosure so that waste heat escaping the heater may be used to heat the gaseous atmosphere within the interspace. Typically, the heater operates directly on the gas or air within the interspace. Typically, the heater does not operate directly on or contact the purification vessel.

According to the methods described herein, a regeneration process includes a regeneration step during which a volume of heated fluid is caused to pass through an interior of a vessel to remove contaminants from filter media contained therein, followed by a cooling step during which fluid is also passed through the vessel interior and filter media to reduce the temperature of both.

During the regeneration step, valves at the vessel inlet and outlet are operated to take the vessel off-line relative to manufacturing equipment, and to allow a regeneration gas heated to a regeneration gas temperature to be passed through the purification medium within the purification vessel. Typical regeneration gas temperatures are in excess of 60 degrees Celsius, often well in excess of 60 degrees Celsius, and may be in the range from 250 to 450 degrees Celsius. In the operation of the apparatus of the present disclosure during a regeneration step, the inlet and the outlet of the enclosure are both closed so that hot air is retained heat within the purification vessel enclosure, i.e., within the interspace. The hot air at the interspace can contribute toward a higher temperature of the vessel and the filter media in the vessel, thereby reducing the amount of time needed for the regeneration step. Optionally, a circulation fans that is located in the interspace can be turned on during the regeneration step to circulate gas or air in the interspace, for more even temperature distribution around the purification vessel, which may also reduce the amount of time required for a regeneration step. Optionally, a heater contained within the interspace can also be turned on during the regeneration step to increase the temperature of gas or air in the interspace, and thereby speed regeneration.

During the cooling step, a cooling gas at a cooling gas temperature is passed through the purification medium within the purification vessel to assist in cooling. The temperature of the cooling gas (the "cooling gas temperature") is below the temperature of the vessel or its contained filter media. Typical cooling gas temperatures are between 10 degrees Celsius and 40 degrees Celsius, e.g., from 10 to 20, 25, or 30 degrees Celsius. The regenerated purification vessel cannot be brought back on line until it has cooled to an appropriate purification temperature, such as below about 40 or 30 degrees Celsius, for example to a temperature in a range from 20 to 25 or 20 to 30 degrees Celsius.

In the operation of the apparatus of the present disclosure, both of the inlet damper and the outlet damper are opened during the cooling step to allow ambient gas (e.g., ambient air) at an ambient gas temperature, from an ambient atmosphere, to enter the interspace and to flow through the interspace to remove heat from the interspace and the vessel, which can preferably reduce the amount of time required for a cooling step. The ambient gas temperature should be below the temperature of the vessel being cooled. Typical ambient gas temperatures can be between 10 degrees Celsius and 30 degrees Celsius, e.g., from 10 to 20, 25, or 30 degrees Celsius.

Optionally, a circulation fans can be turned on during the cooling step to cause gas or air to circulate in the interspace. Optionally, a fan at the inlet, at the outlet, or both, are turned on during the cooling step to draw ambient gas or air into the interspace, cause the air to pass through the interspace, and then cause the air to flow from the interspace through the outlet. Typically, any heater within the interspace is turned off during the cooling step.

One embodiment of an on-site purification system according to the present disclosure is presented at FIG. 1. A first bulk gas source 420, such as a tank, contains a supply of a high purity specialty gas (e.g., "clean dry air") that is useful in a clean room manufacturing system. A second bulk gas source 425 contains a supply of a second high purity specialty gas, e.g., one that may be useful in electronic semiconductor production, for example hydrogen, argon, helium, oxygen, carbon dioxide, nitrogen, or ammonia ($NH_3$). Bulk gas sources 420, 425 may be located external to factory building 800. The bulk gases are supplied to purification systems 500, 510 through conduits 430, 435. Purified clean dry air is supplied to clean rooms 600, 601, 602, 603 through conduits 550. Purified specialty gasses are supplied to work stations 700, 701, 702, 703 through conduits 560. Purification systems 500, 510 operate centrally, delivering multiple gasses to multiple destinations within a manufacturing facility.

Figure 2:
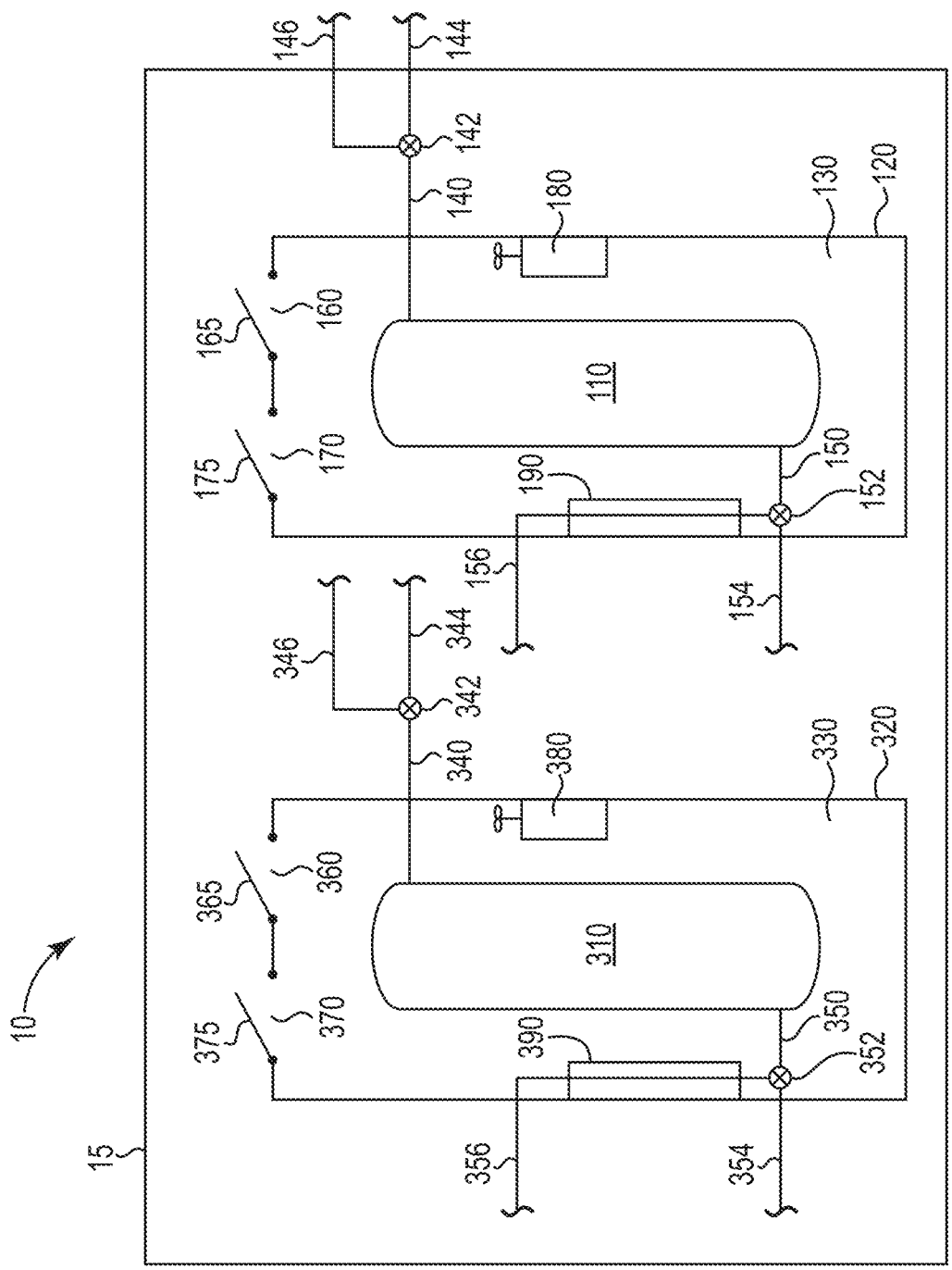
FIG. 2 is a schematic depiction of a portion of one embodiment of a gas purification system according to the present disclosure.

With reference to FIG. 2, a portion of one embodiment of a gas purification system 10 according to the present disclosure is depicted. Gas purification system 10 includes purification vessels 110 and 310. First purification vessel 110 is substantially enclosed on all sides in first purification vessel enclosure 120, which creates first interspace 130 internal to first purification vessel enclosure 120 and external to first purification vessel 110. Likewise second purification vessel 310 is substantially enclosed on all sides in second purification vessel enclosure 320, which creates second interspace 330 internal to second purification vessel enclosure 120 and external to second purification vessel 110.

Purification system housing 15 is external to first purification vessel enclosure 120 and second purification vessel enclosure 320.

The interior of each purification vessel 110, 310 contains purification media (not shown). The interior of each purification vessel 110, 310 is accessed by vessel inlet conduits 150, 350 and vessel outlet conduits 140, 340. During a purification process, i.e., a process of purifying a bulk process gas for use in a manufacturing step, vessel inlet valves 152, 352 may be used to select input from a bulk process gas source (not shown) through bulk process gas inlet conduits 154, 354. During a regeneration process, vessel inlet valves 152, 352 may be used to select input from a regeneration gas source (not shown) through regeneration gas inlet conduits 156, 356.

Regeneration gas is heated to a regeneration gas temperature by passing the regeneration gas through a regeneration gas heater 190, 390. Regeneration gas heaters 190, 390 are located internal to purification vessel enclosures 120, 320 (as shown), i.e., at the interspace 130, 330, but may alternately be located external to purification vessel enclosures 120, 320 (not as shown). During the purification process, vessel outlet valves 142, 342 may be used to select output to a purified bulk process gas distribution system (not shown) through purified bulk process gas outlet conduits 144, 344. During a regeneration process, vessel outlet valves 142, 342 may be used to select output to a regeneration gas destination (not shown), through regeneration gas outlet conduits 146, 346. Depending on the type of regeneration gas used, the regeneration gas destination may be to storage, sequestration, or release to the atmosphere. During typical operation, only one of purification vessels 110, 310 is regenerated at any one time, during which time the other is typically engaged in a purification process.

Purification vessel enclosures 120, 320 include enclosure inlets 160, 360, which may be opened or closed using inlet dampers 165, 365, and enclosure outlets 170, 370, which may be opened or closed using outlet dampers 175, 375. Purification vessel enclosures 120, 320 may optionally include circulation fans 180, 380. Purification vessel enclosures 120, 320 may optionally include heaters 190, 390. During the regeneration step of the regeneration process, which is typically performed for only one vessel at any one time, inlet dampers 165, 365 and outlet dampers 175, 375 are closed. Circulation fans 180, 380 may be turned on. Regeneration gas heaters 190, 390 are turned on. During the cooling step of the regeneration process, inlet dampers 165, 365 and outlet dampers 175, 375 are opened. Circulation fans 180, 380 may be turned on. Regeneration gas heaters 190, 390 are turned off.

With reference to FIG. 3A, during the purification process, vessel inlet valve 152 is used to select input from a bulk process gas source (not shown) through bulk process gas inlet conduit 154 and deliver the gas at a purification gas temperature to the interior of purification vessel 110 through vessel inlet conduit 150. Purified gas exits purification vessel 110 through vessel outlet conduit 140. Vessel outlet valve 142 is used to select output to a purified bulk process gas distribution system (not shown) through purified bulk process gas outlet conduits 144. Inlet damper 165 over enclosure inlet 160 and outlet damper 175 over enclosure outlet 170 may both be opened to allow passive circulation of ambient atmosphere in interspace 130 internal to purification vessel enclosure 120.

With reference to FIG. 3B, during the regeneration step of the regeneration process, vessel inlet valve 152 is used to select input from a regeneration gas source (not shown) through regeneration gas inlet conduit 156, which passes through regeneration gas heater 190 to be heated to a regeneration gas temperature. The regeneration gas is delivered to the interior of purification vessel 110 through vessel inlet conduit 150. Regeneration gas exits purification vessel 110 through vessel outlet conduit 140. Vessel outlet valve 142 is used to select output to regeneration gas outlet conduit 146. Inlet damper 165 over enclosure inlet 160 and outlet damper 175 over enclosure outlet 170 are closed to retain heat in interspace 130 internal to purification vessel enclosure 120. Circulation fan 180 is turned on to distribute heat in interspace 130.

With reference to FIG. 3C, during the cooling step of the regeneration process, vessel inlet valve 152 is used to select input from a cooling gas source (not shown), which is typically the same source as the regeneration gas source (as depicted), through cooling gas inlet conduits 156 at a cooling gas temperature. The cooling gas is delivered to the interior of purification vessel 110 through vessel inlet conduit 150. Cooling gas exits purification vessel 110 through vessel outlet conduit 140. Vessel outlet valve 142 is used to select output to cooling gas outlet conduit 146, which is typically the same outlet as the regeneration gas outlet (as depicted). Inlet damper 165 over enclosure inlet 160 and outlet damper 175 over enclosure outlet 170 are open to allow circulation of ambient atmosphere in interspace 130 internal to purification vessel enclosure 120. Circulation fan 180 is turned on to distribute cooling ambient air in interspace 130.

According to certain preferred methods, a cooling step performed by use of a system as described, that includes air circulating passages as described, with the method including passing a forced (non-convective) flow of ambient air through the interspace, can be performed in a time that is reduced as compared to a comparable (otherwise identical) method that does not include the step of passing the forced flow of ambient air through the interspace. As one example, the cooling step can be one that is carried out with a forced flow of ambient air having a temperature of 25 degrees Celsius, that reduces the temperature of the purification media to below 60 degrees Celsius, wherein the time required to reduce the temperature of the purification media to below 60 degrees is less than 40, 50, or 60 percent of the time that would be required to reduce the temperature of the purification media to below 60 degrees without passing the ambient air at an ambient air cooling temperature through the interspace.

Various modifications and alterations of this disclosure will become apparent to those skilled in the art without departing from the scope and principles of this disclosure, and it should be understood that this disclosure is not to be unduly limited to the illustrative embodiments set forth hereinabove.

The invention claimed is:

1. A bulk process gas purifier system comprising:
a purifier comprising a vessel having a vessel interior that contains purification media,
an enclosure that encloses the vessel and defines an interspace that is inside the enclosure and external to the vessel,
air circulating passages in the enclosure to allow:
a flow of ambient gas into the interspace at a positive input pressure;
non-convective circulation of the ambient gas within the interspace; and
flow of circulated ambient gas from the interspace to an exterior of the enclosure at a positive outlet pressure;
the air circulating passages comprising:
an enclosure inlet that allows a flow of ambient gas at a positive input pressure from the exterior of the enclosure into the interspace;
an enclosure outlet that allows a flow of ambient gas at a positive output pressure from the interspace to an exterior of the enclosure; and
a bulk process gas circulating system adapted to cause the bulk process gas to flow into the vessel interior, through the purification media, and out of the vessel interior.

2. The bulk process gas purifier system according to claim 1 wherein the enclosure inlet has an opening area of at least 7 square inches.

3. The bulk process gas purifier system according to claim 1 wherein the enclosure outlet has an opening area of at least 7 square inches.

4. The bulk process gas purifier system according to claim 1 wherein the enclosure inlet is adapted to receive attachment of inlet ductwork.

5. The bulk process gas purifier system according to claim 1 wherein the enclosure outlet is adapted to receive attachment of outlet ductwork.

6. The bulk process gas purifier system according to claim 1 additionally comprising an inlet damper to open and close the enclosure inlet.

7. The bulk process gas purifier system according to claim 6 wherein the inlet damper is equipped with an inlet actuator capable of opening or closing the inlet damper.

8. The bulk process gas purifier system according to claim 1 additionally comprising an outlet damper to open and close the enclosure outlet.

9. The bulk process gas purifier system according to claim 1 additionally comprising a circulation fan comprising an impeller located within the interspace to circulate a gaseous fluid within the interspace.

10. The bulk process gas purifier system according to claim 1 wherein the enclosure comprises no opening with an opening area of 10 cm$^2$ or more other than the enclosure inlet and the enclosure outlet, wherein the opening area of a pass-through is measured with any items passing through the pass-through in place.

11. The bulk process gas purifier system according to claim 1 wherein the enclosure inlet is located on a top panel of the enclosure and the enclosure outlet is located on a top panel of the enclosure.

12. The bulk process gas purifier system according to claim 1 wherein the positive input pressure exceeds an ambient pressure outside the enclosure by at least 50 torr.

13. The bulk process gas purifier system according to claim 1 wherein the interspace has a positive pressure that exceeds an ambient pressure outside the enclosure by at least 20 torr.

14. The bulk process gas purifier system according to claim 1 wherein the bulk process gas circulating system comprises a heater capable of heating the bulk process gas before the bulk gas flows into the vessel interior.

15. The bulk process gas purifier system according to claim 1 wherein the bulk process gas circulating system includes:
a vessel inlet that leads supply bulk process gas to the vessel, and
a vessel outlet that leads purified bulk process gas from the vessel after passing through the filtration medium.

16. The bulk process gas purifier system according to claim 1 additionally comprising:
a second purifier comprising a second vessel having a second vessel interior that contains second purification media,
a second enclosure that encloses the second vessel and defines a second interspace that is inside the second enclosure and external to the second vessel,
second air circulating passages in the second enclosure to allow:
a flow of ambient gas into the second interspace at a second positive input pressure;
non-convective circulation of the ambient gas within the second interspace; and
flow of circulated ambient gas from the second interspace to an exterior of the second enclosure at a second positive outlet pressure;
the second air circulating passages comprising:
a second enclosure inlet that allows a second flow of ambient gas at a second positive input pressure from the exterior of the second enclosure into the second interspace;
a second enclosure outlet that allows a flow of ambient gas at a second positive output pressure from the second interspace to an exterior of the second enclosure; and
a second bulk process gas circulating system adapted to cause the bulk process gas to flow into the second vessel interior, through the second purification media, and out of the second vessel interior.

* * * * *